United States Patent [19]

Pensa

[11] 4,026,108

[45] May 31, 1977

[54] CONTROL DEVICES FOR HYDROSTATIC TRANSMISSIONS

[75] Inventor: Carlo Pensa, Esino Lario, Italy

[73] Assignee: Massey-Ferguson Services N.V., Curacao, Netherlands Antilles

[22] Filed: Nov. 17, 1975

[21] Appl. No.: 632,882

[30] Foreign Application Priority Data

Nov. 18, 1974 United Kingdom ............ 49875/74

[52] U.S. Cl. .................................. 60/444; 60/486; 60/488; 60/492
[51] Int. Cl.² ....................................... F16H 39/46
[58] Field of Search ............ 60/388, 389, 391, 443, 60/444, 445, 448, 486, 487, 488, 489, 490, 491, 492

[56] References Cited

UNITED STATES PATENTS

| | | | |
|---|---|---|---|
| 2,161,439 | 6/1939 | Thoma | 60/490 X |
| 3,126,707 | 3/1964 | Hann et al. | 60/389 |
| 3,230,699 | 1/1966 | Hann et al. | 60/444 |
| 3,371,479 | 3/1968 | Yapp et al. | 60/445 X |
| 3,561,212 | 2/1971 | Pinkerton et al. | 60/492 |

*Primary Examiner*—Edgar W. Geoghegan
*Attorney, Agent, or Firm*—Thomas P. Lewandowski

[57] ABSTRACT

A hydrostatic transmission is provided with a variable capacity pump and a variable capacity motor. A control is operable to operate sequentially the pump and motor. A second control is provided to operate on the pump to override the signal to the pump from the first control without altering the setting of the motor. The first control thus acts as a ratio selector and the second control as a clutch.

11 Claims, 3 Drawing Figures

CONTROL DEVICES FOR HYDROSTATIC TRANSMISSIONS

This invention relates to hydrostatic transmissions and in particular to controls therefore.

A hydrostatic transmission comprises a prime mover driving a pump which is hydraulically connected to a motor. The motor is operable on a load.

The pump is usually a variable capacity pump and the range of output speeds from the transmission is determined by the ratio of the capacities of the pump and motor. The greater the ratio, the greater the maximum speed range. The maximum system pressure is usually determined by a relief valve and so the maximum torque delivered by the transmission is also determined by the ratio of the capacities of the pump and motor. In this case the smaller the ratio the greater the torque output.

Thus conflicting requirements may occur between the desired torque output and the speed range obtainable. It is therefore usual to provide a variable capacity motor which, when at a maximum capacity, provides the maximum torque output and, when at a minimum capacity, provides the maximum speed range.

The controls associated with the above transmissions usually provide for sequencing of the pump and motor i.e. movement of a control handle will firstly increase the capacity of the pump with the motor at maximum capacity and secondly upon attainment of the pumps maximum capacity, reduce the motor capacity to a minimum.

When such transmissions are subjected to light load, i.e. when propelling an unladen vehicle, the maximum torque capacity is not required. However, the control arrangement is such that the pump must operate prior to the motor before the most desirable transmission ratio is reached. This increases the response time of transmission and results in sluggish operation.

A further desirable feature is that the maximum speed of the transmission may be varied whilst maintaining full sensitivity of the controls within a given range.

It is an object of the present invention to provide such a control and which obviates or mitigates the above disadvantages.

According to the present invention there is provided a control for a hydrostatic transmission having a variable capacity pump and a variable capacity motor, said control comprising first control means operable to cause variation in firstly the capacity of said pump and secondly in the capacity of said motor, and second control means operable to vary the capacity of said pump independently of said first control means.

Preferably override means are provided to successively increase the capacity of said motor and then reduce the capacity of said pump upon attainment of a predetermined parameter of said transmission.

An embodiment of the invention will now be described by way of example only with reference to the accompanying drawings in which FIG. 1 is a cross sectional view of a servo motor and controls therefore.

Figure 1:
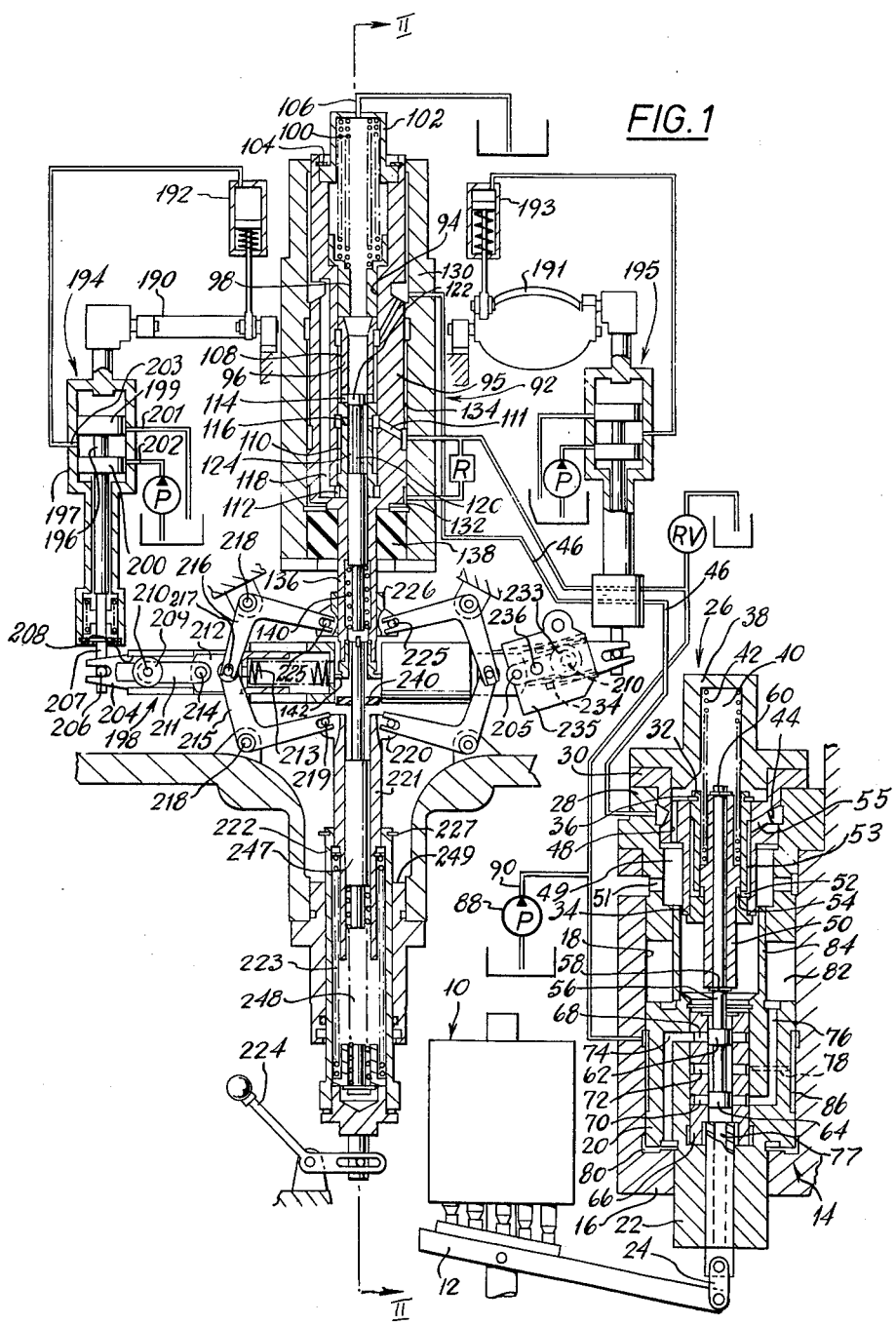

Referring now to FIG. 1, a hydraulic motor 10 is provided with a capacity adjusting member 12. The motor 10 is of conventional form known as a swashplate machine and will not be described in further detail.

A servo motor 14 comprises a body 16 which is bored to define a cylinder 18, a piston 20 slidably and sealingly mounted within the cylinder 18 and connected to a piston rod 22. The piston rod 22 is connected by a link 24 to the adjusting member 12.

A closure assembly 26 is attached to the body 16 to close one end of the cylinder 18 and is formed in four parts. A generally cylindrical housing 28 connects a ported sleeve 30 to the body 16. A cylinder 32 is mounted within the sleeve 30 and secured there by a shoulder 34 and a circlip 36. An end cap 38 is formed with a recess 40 to accommodate a spring 42 and is connected to the sleeve 30.

The inner surface of the sleeve 30 is undercut to form an annular recess 44 which communicates with a pressure sensing duct 46. A drain port 48 is also formed in sleeve 30 to connect the recess 40 with a chamber 49 formed between the housing 28 and the sleeve 30. A drain port 51 is provided in the housing 28 and the body 16 to allow fluid to return to sump.

A piston 50 is slidably mounted within the cylinder 32 and is biased toward one end of the cylinder by the spring 42. A cross drilling 52 connects a chamber 54 formed between the piston 50 and the cylinder 32 with an annulus 53 around the cylinder 32 via cross drilling 55 with the recess 44.

The piston 50 is connected to a spool 56 by circlips 58, 60. The spool 56 is provided with lands 62, 64 and is slidably mounted within a valve block 66 which itself is mounted within the piston 20.

The valve block 66 is provided with ports 68, 70, 72 which respectively register with conduits 74, 76, 78 formed in the piston 20. The conduit 74 communicates with a chamber 80 formed between the piston 20, the cylinder 18 and the piston rod 22; the conduit 76 communicates with a chamber 82, formed between the piston 20, the cylinder 18 the housing 28 and a tubular extension 84 of the piston slidably received within the housing 28; and the conduit 78 communicates with an annular recess 86 on the outer surfaces of the piston 20.

The recess 86 is supplied with fluid from a pump 88 through a duct 90. The duct 90 also supplies fluid to a control valve assembly 92 which is arranged within a bore 94 within a piston 95. A sleeve 96 is slidably mounted within the bore and abuts a collar 98 which is biased toward the sleeve by a spring 100 acting between the collar and an endcap 102. The endcap 102 is secured within the bore 94 by a circlip 104 and has a bleed hole 106 in its end surface.

The sleeve 96 has three annular recesses 108, 110, 112 on its outer surface and ports 114, 116, connect the interior of the sleeve with the recesses 108, 110 respectively. The duct 90 supplies fluid to the recess 110 by way of port 111 in the piston 95 and a control duct 118 interconnects recesses 108 and 112. The duct 118 also supplies fluid to the pressure sensing duct 46.

A spool 120 is slidably mounted within the sleeve 96 and a recess 124 is formed on the outside of the spool 120 so as to define a land 122.

The piston 95 is slidably mounted within a cylinder 130 and defines two working chambers 132, 134 of differing cross sectional area, the chamber 132 being greater than the chamber 134.

Fluid is supplied to the chamber 134 by the pump 88 and conduit 90. Flow of fluid to or from the chamber 132 is controlled by a regulator valve R which is responsive to changes in a predetermined parameter of the transmission. This may be any convenient regulator, for example controlling the torque delivered by the motor, the pressure delivered by the pump or the power absorbed by the pump. The piston 95 has a piston rod 136 connected to it and the cylinder 130 is sealed by a gland 138. A spring 140 acts between the spool 120 and the piston rod 136.

FIG. 1 shows an apparatus for controlling a plurality of pump and motors.

Pump swashplates 190, 191 are adjusted by means of servomotors 192, 193 which are controlled by valves 194, 195. Each of the valves 194, 195 comprises a spool 196 movable within a body 197 by a control mechanism 198. Lands 199, 200 on the spool 196 open or close ports 201, 202 to control flow from or to the servomotor through a port 203 in the valve body 197.

The control mechanism 198 comprises an actuating link 204 pivotally connected at one end by a pin 205 to the body of a transmission case. The other end is connected by a pin 206 to an extension 207 of the spool 196. A track 208 is formed on the actuating link 204 and co-operates with a roller 209 which is rotatably mounted on a pin 210 carried by a sliding link 211.

The sliding link 211 is pivotally connected by a pin 214 to a plunger 212 which is slidably mounted in the transmission case and biased out of the case by a spring 213. A pin 217 passes through the plunger 212 and the forked ends of a pair of bellcranks 215, 216 which are pivotally connected to the transmission case by pins 218 co-operate with it.

The other end of the bellcrank 215 co-operates with a pin 219 on a collar 220. The collar 220 is fixed to a rod 221 which is slidably mounted in a cylinder 222, the rod 221 and the cylinder 222 being biased apart by a spring 223. The cylinder 222 is connected to a handle 224 which is used to determine the speed range of the transmission.

The bellcrank 216 is connected between the pin 217 and a pin 225 on a collar 226 that is slidably mounted on the piston rod 136.

A roller 233 is rotably mounted on the pin 210 on the opposite side of the sliding link 211 to the roller 209. The roller 233 co-operates with a track 234 on a lever 235 which is pivoted on a pin 236 which is mounted in the transmission case.

Figure 2:
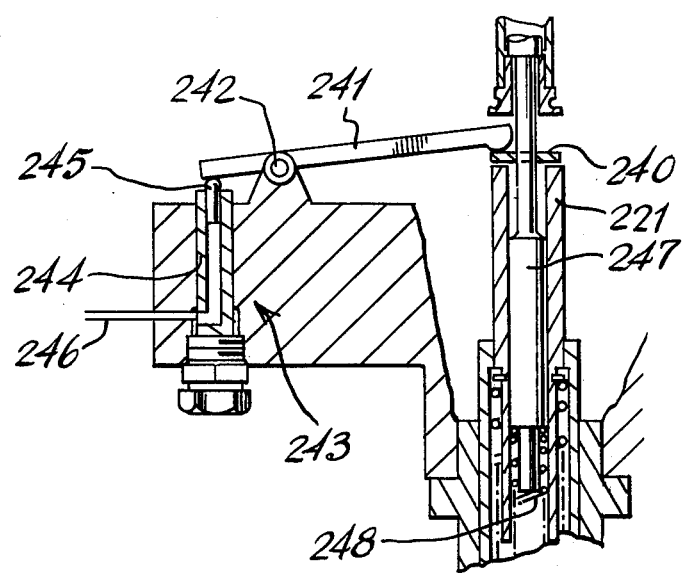
FIG. 2 is a scrap section along the line II—II of FIG. 1.

As can best be seen in FIG. 2 the rod 221 houses a shaft 247 which has a shoulder 240. Lever 241 abuts the shoulder 240 and is pivoted by a pin 242 intermediate its ends to the transmission casing. A hydraulic actuator 243 comprising a cylinder 244 and a piston 245 acts on the other end of the lever 241. The cylinder 244 is supplied with fluid delivered by the swashplate pumps having swash plates 190, 191 by means of a conduit 246.

The shaft 247 is biased away from the end of the cylinder 221 by a spring 248.

The operation of the device will now be described with reference to a hydrostatic transmission installed in a crawler type vehicle, in which each of the pumps having swash plates 190, 191 supply fluid to a track motor 10 arranged to drive its respective track independently of the other.

The lever 227 is rotated fully clockwise so that the circlip 227 abuts the end face 249 of the transmission casing. The rod 221 is thus pulled toward the face 249 and causes the bellcrank 215 to rotate clockwise, moving the roller 209 along the track 208 and compressing the spring 213. The bellcrank 216 also rotates and moves the collar 226 along the piston rod 136. In this position the pin 210 is aligned with the centre line of the pin 236 and so angular movement of the lever 235 does not cause movement of the pin 210 or the actuating link 204. Thus, in this condition, the vehicle transmission is in a neutral condition.

In order to set the speed range of the transmission, the lever 224 is rotated anticlockwise causing the rod 221 to move away from the face 249 and move the roller 209 along the tracks 208 on the actuating link 204. Rotation of the pin 236 will now cause movement of the pin 210 and consequently the actuating link 204. This will cause the spool 196 to move to uncover the port 202 and allow fluid to flow into the line 203 and the cylinder 192 to increase the displacement of the pump swash plate 190. The body 197 moves with the swashplate 190 to cut off the flow after it has moved to the desired value.

Each track may be controlled independently of the other by rotation of the respective control lever (not shown) which in turn rotates the pin 236. The pin 236 imparts rotation upon the lever 235 which in turn co-operates with the roller 233, the pin 210 and the roller 209 to rotate the actuating link 204 about the pin 205. The actuating link 204 moves the spool 196 to open either the port 201, 202 and allows fluid into or from the cylinder 192 to move the swashplate 190. The body 197 then closes the port 201, 202 and the swashplate 190 is locked in a new position.

If the lever 224 is rotated anticlockwise about its pivot beyond the position shown in the drawings the spool 120 will move along the sleeve 96 toward the endcap 102. The land 122 uncovers the port 114 and allows fluid to flow from the duct 90 through the port 116 and by way of port 114 into the recess 108. Fluid can flow into the control duct 118 to the pressure sensing duct 46 and also to the recess 112. Fluid in the duct 46 can pass through the recess 44, and the cross drilling 52 into the chamber 54 where it operates on the piston 50 to move it against the spring 42. The pressure of the fluid thus rises in proportion to the displacement of the piston 50. As the pressure rises, the sleeve 96 is displaced against the bias of the spring 100. The pressure will thus continue to rise until the land 122 once again covers the port 114. Thus the pressure in the duct 118 and hence the displacement of the piston 50 is proportional to the displacement of the spool 120.

Movement of the piston 50 is transmitted to the spool 56 so that the land 62 uncovers the duct 74 and fluid can flow from the port 78 into the chamber 80.

The piston 20 thus moves along the cylinder 18 to reduce the capacity of the machine 10 and fluid from the chamber 82 is exhausted through the duct 76 and the drain hole 77. The piston 20 will continue to move until the land 62 once again covers the duct 74. Thus the machine capacity is reduced in proportion to the displacement of the piston 50 which in turn is proportional to the displacement of the spool 120.

If the control lever 224 is then rotated clockwise, the land 122 will uncover the port 114 and allow fluid from the line 118 to flow to sump through the drain hole 106. The pressure drops to the duct 118 until the sleeve once again covers the port 114. The drop in pressure allows the piston 50 to move under the influence of the spring 42 to move the spool 56 allowing fluid to pass from the port 78 into the chamber 82 and increase the capacity of the machine 10.

Should the chosen parameter exceed the value set by the regulator valve R, then fluid will flow into the chamber 132 and, due to the differential areas of the piston 95, move the piston 95 along the cylinder 130. The sleeve 96 moves with the piston 95 because of the hydraulic 'lock' in the recess 112 and so the land 122 uncovers the port 114, causing the motor 10 to increase its capacity in the manner described above.

Should the regulator valve R continue to allow fluid to flow into the chamber 132, the collar 226 wil be picked up by the shoulder 142 and cause the bellcrank 216 to rotate anticlockwise about its pin 218 so reducing the capacity of the pumps having swash plates 190, 191.

When the regulator valve R allows fluid out of the chamber 132, the piston 95 will move down the cylinder 130 and so allow the pump displacement to decrease to their original values.

If the pressure delivered by the pumps rises above a predetermined level, the piston 245 (FIG. 2) will overcome the force of the spring 248 and telescope the rod 247 within the sleeve 221. Thus the motor capacity will be reduced. If the pressure is still above the predetermined level, the shoulder 240 will abut the rod 221 and cause the bellcrank 215 to rotate on the pin 217. The plunger 212 thus moves against the spring 213 and moves the rollers 209, 233 along the tracks 208, 234 respectively.

Since the track 234 is held rigidly (due to the connection with the hand lever) the actuating link 204 is rotated about the pin 205 and acts on the spool valve 194, 195 to decrease the capacity of the pumps in a ratio equal to the ratio of the capacities set by the individual hand levers until the excessive pressure is overcome. Thus the vehicle will continue along its path without deviation but at a slower speed. When the pressure decreases the piston 245 (FIG. 2) will move down the cylinder 244 and the speed of the vehicle will again be increased.

Figure 3:
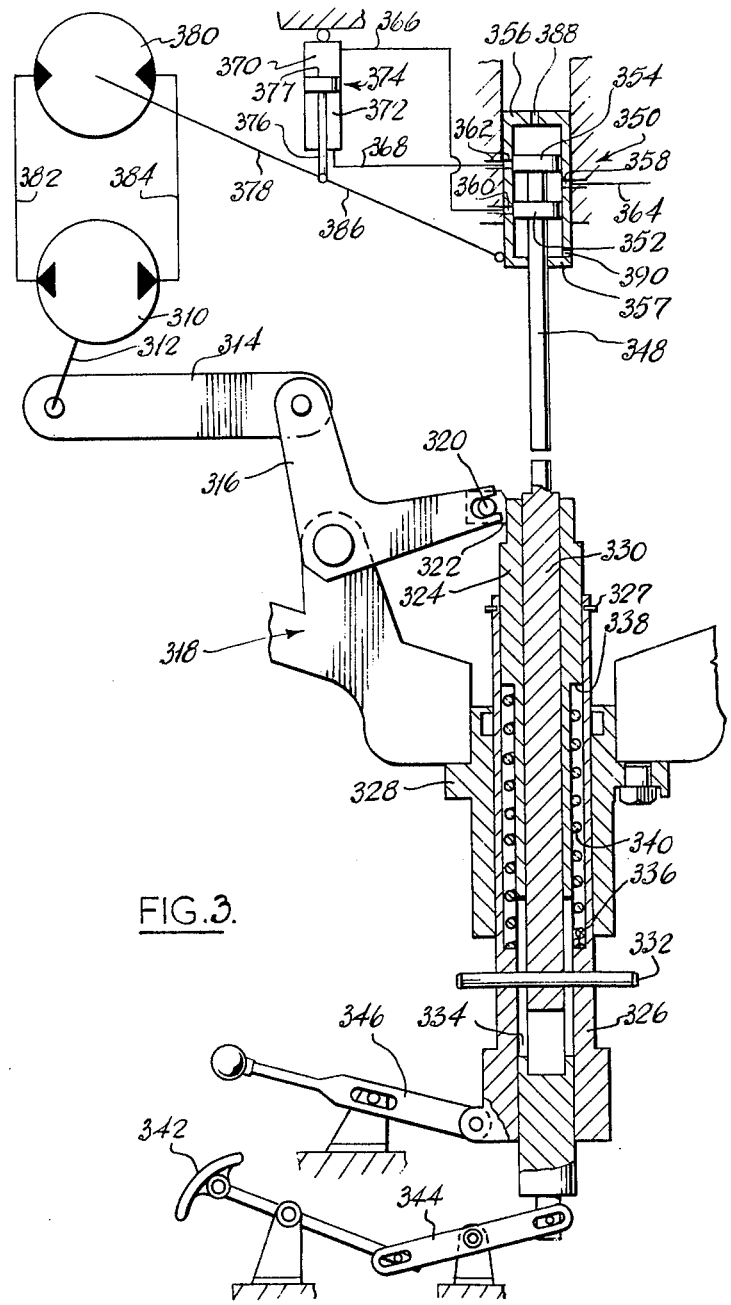
FIG. 3 is a further embodiment showing the invention applied to a transmission having a single pump and motor.

The embodiment of FIG. 3 shows the invention applied to a transmission having a single pump and motor.

A variable capacity pump 310 is provided with a stroke adjusting member 312 which is connected by a link 314 to one end of a bellcrank 316. The bellcrank 316 is pivotally mounted to a casing 318 and its other end is forked so as to engage a pin 320 carried by a flange 322.

The flange 322 is formed at one end of a cylindrical sleeve 324 which is slidably mounted within a second cylindrical sleeve 326. The sleeve 326 is itself slidably mounted within a housing 328 connected to the transmission casing 318 and a circlip 327 limits movement of the sleeve 326 in the housing 328.

A rod 330 is slidably mounted within the sleeve 324 and is connected to the sleeve 326 for movement therewith by a pin 332 which passes through a slot 334 in the sleeve 324.

The outer surface of the sleeve 324 and the inner surface of the sleeve 326 are provided with shoulders 336, 338 respectively so that an annular void is formed between the two sleeves. A spring 340 is housed in the void and abuts the shoulders 336, 338.

The sleeve 324 is connected to a foot operated pedal 342 by link 344 and the sleeve 326 is connected to a hand operated lever 346.

The rod 330 is axially aligned with a spool 348 of a hydraulic valve 350. The spool has upstanding lands 352, 354 and a valve body 356 has ports 358, 360, 362. The body 356 is slidably mounted in a support bracket 357 fixed to the casing 318. A pressure supply line 364 is connected to the port 358 and hydraulic lines 366, 368 respectively connect the ports 360, 362 and headside and rodside chambers 370, 372 of a hydraulic actuator 374. A piston rod 376 connected to a piston 377 of the actuator 374 acts upon a stroke adjusting member 378 of a hydraulic motor 380 which is hydraulically connected to the pump 310 by fluid conduits 382, 384. A link 386 which is pivotally mounted intermediate its ends is connected between the piston rod 376 and the valve body 356. The body 356 is provided with drain holes 388, 390.

The operation of the device will now be described assuming that the pump 310 is at minimum capacity and the motor 380 is at maximum capacity, i.e. the hand operated lever 346 is rotated fully clockwise so that the circlip 327 abuts the housing 328. In this position the hydrostatic transmission formed by the pump 310 and the motor 380 is in a neutral, i.e. a zero speed, condition.

The hand operated lever 346 is rotated anticlockwise causing the sleeve 326 and the rod 330 to slide in the housing 328. The sleeve 324 moves with sleeve 326 to rotate the bellcrank 316 and move the link 314 and the stroke adjustment member 312. The pump 310 thus delivers fluid to the motor 380.

After a predetermined movement of the lever 346 the rod 330 abuts the spool 348 and displaces it in the body 356. The land 354 uncovers the port 362 and allows fluid to flow from the pressure supply line 358 to the rodside chamber 372. Fluid from the headside chamber 370 can flow through the line 366, the port 360 and drain hole 390. The piston 377 of the actuator 374 and thus moves the piston rod 376 and the stroke adjusting member 378 to decrease the capacity of the motor 380 and so increase the transmission ratio. Movement of the adjusting member 386 also moves the body 356 until the lands 352, 354 once again cover the ports 360, 362. Thus it will be seen that manipulation of the lever 346 changes both the speed and ratio of the transmission.

If it is desired to reduce the speed of the transmission then rotation of the pedal 342 anticlockwise about its pivot will move the sleeve 324 relative to the sleeve 326 by compressing the spring 340 and rotate the bellcrank clockwise to reduce the capacity of the pump 310 and hence the speed of the motor. Full depression of the pedal will reduce the capacity of the pump 310 to a neutral condition. When the pedal 342 is released, the spring 340 will return the sleeve 324 and the stroke adjusting member 312 to its previous condition.

The arrangement described is particularly useful in earthmoving equipment such as wheeled shovel loaders or fork lifts in place of conventional transmissions.

The control of FIG. 3 may be used in one of two ways.

Firstly the lever 346 may be used to control the speed of the vehicle with the pedal 342 being used to control the vehicle as it approaches for example a lorry when other controls have to be manipulated with the hands.

Secondly the lever 346 may be used to set the maximum speed of the vehicle with the pedal 342 being used to control actual forward speed in a similar manner to an "accelerator" pedal.

The arrangement has further advantages in that when the transmission is in neutral whilst loading the lorry then no power is being absorbed by the transmission. Also, when the pedal 342 is used positive braking is applied to the vehicle by the transmission at all times.

It will be seen that in both embodiments the capacity of the motor may be varied by the lever whilst maintaining the capacity of the pump at zero. Thus the control is analogous to that of a manual change speed gearbox with a friction clutch, the lever selecting the gear ratio and the pumps acting as the clutch.

The position of the lever also acts to limit the range of output speeds of the motor. However, by virtue of the linkage the range of movement of the lever remains constant for all positions of the lever so that sensitivity of the controls is maintained.

What we claim is:

1. A hydrostatic transmission having a variable capacity pump and a variable capacity motor, a first manual control including first control means, said first control means including a first portion thereof operable to cause variation in firstly the capacity of said pump and a second portion thereof operable to secondly cause variation in the capacity of said motor to thereby set a ratio between said pumps and motor with said first manual control, and a second manual control including second control means operable to vary only the capacity of said pump independently of said first control means without changing the setting of said first manual control means.

2. A transmission according to claim 1 wherein override means are provided to successively increase the capacity of said motor and then reduce the capacity of said pump upon attainment of a predetermined parameter of said transmission.

3. The transmission of claim 2 wherein said predetermined parameter is the power consumption of said transmission.

4. The transmission of claim 1 wherein said first and second portions include first and second linkages and valve means respectively, said first linkage being connected to said first valve means for varying the capacity of said motor and said second linkage being connected to said second valve means for varying the capacity of said pump.

5. The transmission of claim 4 wherein said second control means is operable upon said second linkage to control operation of said valve means.

6. The transmission of claim 4 wherein said second linkage includes a first link pivotally mounted for rotation about a fixed axis and operable upon said valve means to cause movement thereof, first guide means extending along said first link, a follower engaged with said first guide means and movable therealong by said manual lever, said second control means including a second link pivotally mounted for rotation about an axis spaced from said fixed axis, said second link including second guide means extending therealong and engaging said follower so as to transmit movement from said second link to said first link.

7. The transmission of claim 6 wherein said second link is connected to a second manual control member operable to cause pivotal movement of said second member.

8. The transmission of claim 4 wherein pressure sensing means are operable firstly upon said first linkage to increase the capacity of said motor and secondly upon said second linkage to decrease the capacity of said pump, said pressure sensing means sensing the pressure delivered by said pump.

9. The transmission of claim 8 wherein said pressure sensing means includes a link pivoted intermediate its ends, one end being operable upon said first linkage and the other end abutting a piston slidable in a cylinder which is hydraulically connected to said pump.

10. The transmission of claim 9 wherein said first linkage includes a shoulder to abut said second linkage and cause movement thereof upon movement of said piston out of said cylinder.

11. The transmission of claim 6 including override means responsive to attainment of a predetermind parameter in said transmission, said override means being operable to cause movement of said follower along said first guide means.

* * * * *